(12) United States Patent
Makiguchi et al.

(10) Patent No.: US 11,712,986 B2
(45) Date of Patent: Aug. 1, 2023

(54) SEAT ADJUSTMENT DEVICE

(71) Applicant: HONDA MOTOR CO., LTD., Tokyo (JP)

(72) Inventors: Fumiya Makiguchi, Tokyo (JP); Masakazu Okada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/676,254

(22) Filed: Feb. 21, 2022

(65) Prior Publication Data

US 2022/0305971 A1     Sep. 29, 2022

(30) Foreign Application Priority Data

Mar. 29, 2021   (CN) .......................... 202110335577.8

(51) Int. Cl.
    *B60N 2/66*        (2006.01)
    *B60N 2/90*        (2018.01)
    *A47C 7/46*        (2006.01)

(52) U.S. Cl.
    CPC .............. *B60N 2/665* (2015.04); *A47C 7/467* (2013.01); *B60N 2/914* (2018.02)

(58) Field of Classification Search
    CPC .......... B60N 2/914; B60N 2/665; A47C 7/467
    See application file for complete search history.

(56) References Cited

U.S. PATENT DOCUMENTS

| | | | | |
|---|---|---|---|---|
| 4,589,695 A | * | 5/1986 | Isono | A47C 7/029 297/284.6 |
| 5,772,281 A | * | 6/1998 | Massara | B60N 2/914 297/284.6 |
| 5,884,968 A | * | 3/1999 | Massara | B60N 2/643 297/216.12 |
| 9,517,777 B2 | * | 12/2016 | Hall | B60N 2/914 |
| 11,076,698 B2 | * | 8/2021 | Munechika | B60N 2/665 |
| 2006/0049678 A1 | * | 3/2006 | Kern | A47C 7/467 297/284.3 |
| 2016/0375809 A1 | * | 12/2016 | Nguyen | B60N 2/882 297/396 |
| 2018/0055230 A1 | * | 3/2018 | Cheng | A47C 7/467 |
| 2018/0079336 A1 | | 3/2018 | Hashimoto et al. | |

FOREIGN PATENT DOCUMENTS

JP        2016196202 A     11/2016

\* cited by examiner

*Primary Examiner* — Syed A Islam
(74) *Attorney, Agent, or Firm* — CKC & Partners Co., LLC

(57) ABSTRACT

To provide a seat adjustment device capable of flexibly changing a shape of a seat. A seat adjustment device for adjusting a shape of a seat includes a pad including an elastomer, and airbags disposed on a front surface and a rear surface of the pad. The airbags are adjustable in amount of air therein. The airbags include a first airbag disposed on one of the front and rear surfaces and of the pad, and a second airbag disposed on the other. The first airbag is longer than the second airbag in a direction substantially perpendicular to the front and rear surfaces of the pad. The second airbag is longer than the first airbag in a direction substantially parallel to the front and rear surfaces of the pad.

5 Claims, 4 Drawing Sheets

SEAT ADJUSTMENT DEVICE

This application is based on and claims the benefit of priority from Chinese Patent Application No. CN202110335577.8, filed on Mar. 29, 2021, the content of which is incorporated herein by reference.

BACKGROUND OF THE INVENTION

Field of the Invention

The present invention relates to a seat adjustment device.

Related Art

Conventionally, seats for vehicles and the like have a configuration in which the position of a seat back surface thereof is adjustable depending on a user's posture and body shape. A seat is disclosed that has an air-filled airbag disposed inside thereof, so that the position of the front surface of the seat can be moved in a frontward direction of the seat by inflating the airbag (see, for example, Patent Document 1).

Patent Document 1: Japanese Unexamined Patent Application, Publication No. 2016-196202

SUMMARY OF THE INVENTION

A single layer of airbag is not sufficient to deal with a variety of postures that users can assume. There is a demand for a device capable of changing the shape of the seat flexibly depending on habits of individual users, and differences in body shape and physical size between individual users for when, for example, the user of the seat has a hunched back.

(1) A seat adjustment device (for example, a seat adjustment device 1) for adjusting a shape of a seat (for example, a seat 100), including: a pad (for example, a pad 3) including an elastomer; and airbags (for example, airbags 4) disposed on a front surface (for example, a front surface 3a) and a rear surface (for example, a rear surface 3b) of the pad, the airbags being adjustable in amount of air therein, the airbags including a first airbag (for example, a first airbag 41) and a second airbag (for example, a second airbag 42), the first airbag being disposed on one of the front and rear surfaces of the pad, the second airbag being disposed on the other, the first airbag being longer than the second airbag in a direction substantially perpendicular to the front and rear surfaces of the pad, the second airbag being longer than the first airbag in a direction substantially parallel to the front and rear surfaces of the pad.

(2) In the seat adjustment device according to (1), preferably, the first airbag is located above the second airbag.

(3) In the seat adjustment device according to (1) or (2), preferably, the first airbag includes a first airbag group (for example, a first airbag group 410) including a plurality of sub-bags (for example, sub-bags 40) arranged in the direction substantially perpendicular to the front and rear surfaces of the pad, and the second airbag includes a second airbag group (for example, a second airbag group 420) including a plurality of sub-bags arranged in the direction substantially parallel to the front and rear surfaces of the pad.

(4) The seat adjustment device according to (1) preferably further includes a mat member (for example, a mat member 5). In the seat adjustment device, preferably, the second airbag is disposed on the rear surface of the pad, and the mat member is disposed against a rear surface of the second airbag.

According to the configuration described in (1), as one of the airbags on the front surface and the rear surface of the pad 3 extends long and inflates in the direction substantially perpendicular to the front and rear surfaces of the pad, it is possible to raise a front surface of the seat in a thickness direction of the seat to a significant extent. Furthermore, as the other airbag extends long and inflates in the direction substantially parallel to the front and rear surfaces of the pad, it is possible to raise a specific area of the front surface of the seat into a gentle curve. Employing these airbags and allowing the airbags to be inflated in both of the two different directions makes it possible to change and adjust the shape of the seat more flexibly and freely, allowing for expanded range and magnitude of the change in the shape of the seat. Thus, the configuration described above enables the seat to support the back of the user of the seat more effectively.

According to the configuration described in (2), an upper portion of a seat back surface of the seat is raised, and thus the seat is easily made suitable in shape for the user in a case where the user has a hunched back, for example.

The configuration described in (3) allows lengths by which the first airbag and the second airbag are extended in the substantially perpendicular direction and in the substantially parallel direction, which in other words are, for example, the size, the range, and the degree of inflation of each airbag, to be changed finely and flexibly. As a result, it is possible to change the shape of the seat more flexibly and freely.

According to the configuration described in (4), the mat member works to support the second airbag group and hold the rear surface of the second airbag group so that the second airbag is extended frontward when the second airbag is inflated. Thus, it is possible to change the shape of the pad in a stable manner.

DETAILED DESCRIPTION OF THE INVENTION

Figure 1:
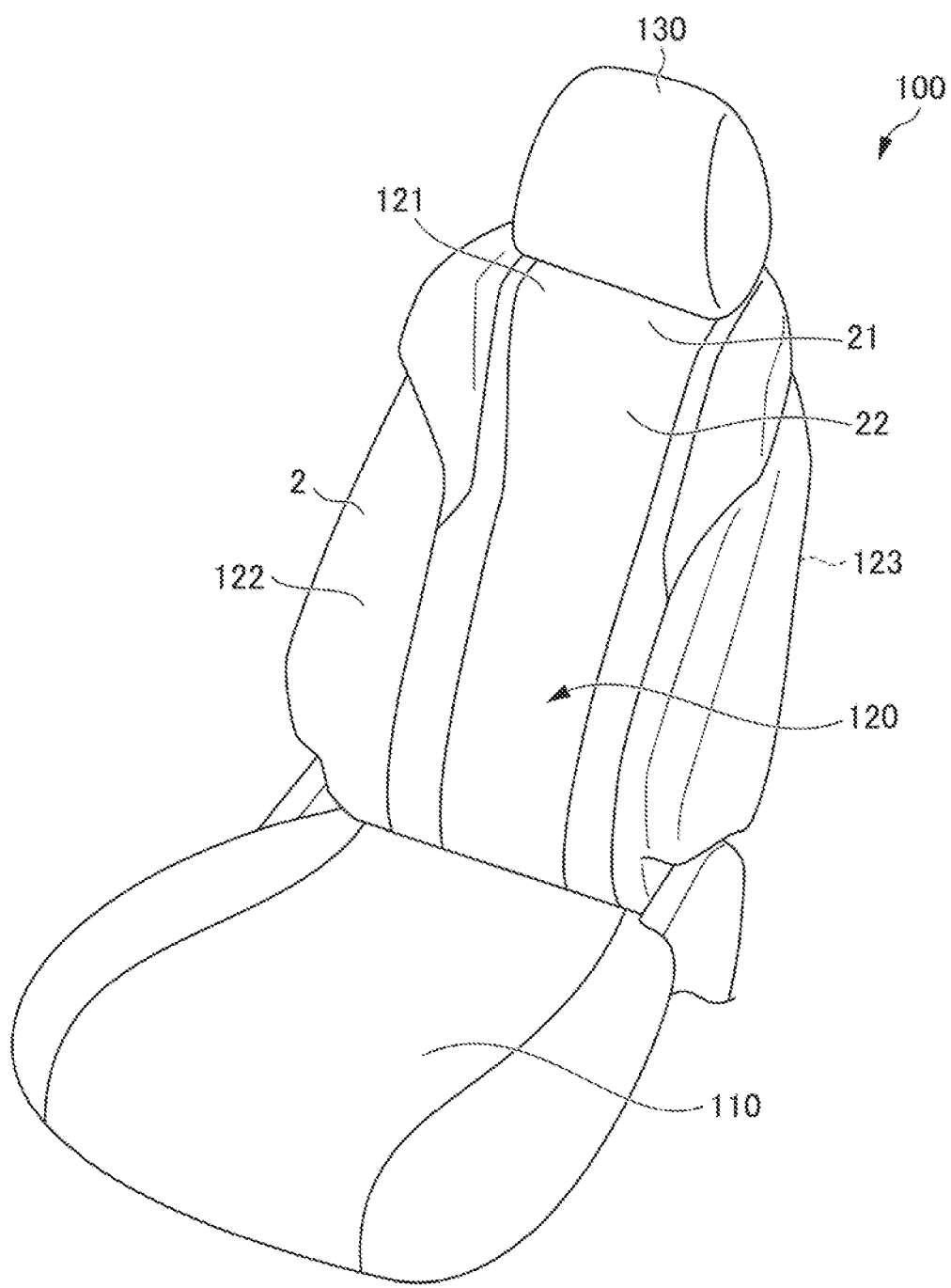
FIG. 1 is a perspective view of a seat according to an embodiment of the present invention.

The following describes an embodiment of the present invention in detail with reference to the accompanying drawings. A seat adjustment device 1 according to the present embodiment is disposed inside a seat 100, which is a vehicle seat. The seat adjustment device 1 changes and adjusts the shape of the seat 100 so that the seat 100 is suitable in shape for a user sitting thereon. As illustrated in FIG. 1, the seat 100 has a seating part 110, a seat back part 120, and a headrest 130. Surfaces of the seating part 110, the seat back part 120, and the headrest 130 are covered with a seat cover 2.

The seating part 110 has a surface that the user sits on and that receives the user's weight. The headrest 130 supports the user's head. The headrest 130 is not shown in FIG. 2. The seat back part 120 functions as a backrest and supports the user's upper body. The seat back part 120 and the seat cover 2 form a portion of the seat adjustment device 1.

Figure 2:
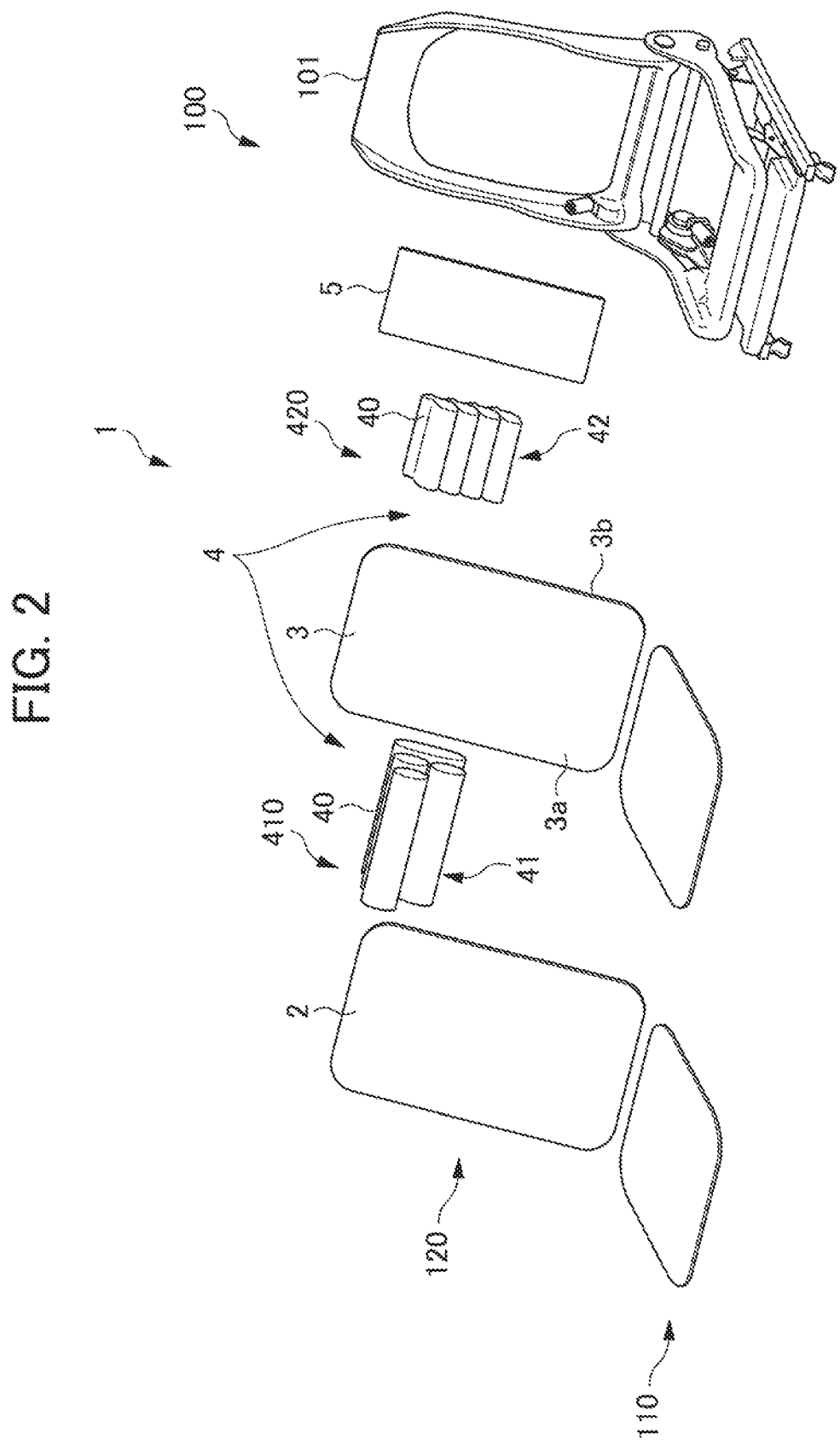
FIG. 2 is an exploded view of a seat adjustment device according to the embodiment.

As illustrated in FIG. 2, the seat adjustment device 1 includes the seat back part 120, the seat cover 2, a pad 3, airbags 4, and a mat member 5.

The seat back part 120 has a top face 121, a front face 122, and a rear face 123 as illustrated in FIG. 1. The seat back part 120 also has a seat frame 101, a urethane sponge 102 (see FIG. 3), and the seat cover 2.

The top face 121 is a side that is located at the top of the seat back part 120 and that extends in a thickness direction of the seat 100. The headrest 130 is attached to the top face 121. The front face 122 is a side that is located at the front of the seat back part 120 and against which the user rests. The rear face 123 is a side that is located at the rear, which is opposite to the front face 122.

The seat frame 101 is a framework of the seat 100 to be disposed in a vehicle, and is a highly rigid frame that mainly forms the outer shape of the seat 100. The seat frame 101 is configured to allow the position of the seat 100 to be adjusted in a front-rear direction and allow the angle between the seating part 110 and the seat back part 120 to be adjusted.

The urethane sponge 102 is a padding disposed between the seat frame 101 and the seat cover 2. The urethane sponge 102 is a cushioning material of the seat 100.

The seat cover 2 forms a front surface of the seat 100. The seat cover 2 is made from, for example, a thin, low-stiffness material such as cloth. The seat cover 2 is disposed outside the seat frame 101, and the user makes direct contact with the seat frame 101. As illustrated in FIG. 1, the seat cover 2 has a top seat cover portion 21 and a front seat cover portion 22. The top seat cover portion 21 is a portion of the seat cover 2 and is provided on a surface of the top face 121 of the seat back part 120. The front seat cover portion 22 is a portion of the seat cover 2 and is provided on a surface of the front face 122 of the seat back part 120.

The pad 3 is an elastomer disposed under a rear surface of the seat cover 2. The pad 3 has a predetermined thickness and is made from, for example, urethane. The pad 3 and the urethane sponge are separate members. The pad 3 is disposed inside the seat back part 120 and has a shape that matches the shape of the seat back part 120.

Figure 3:
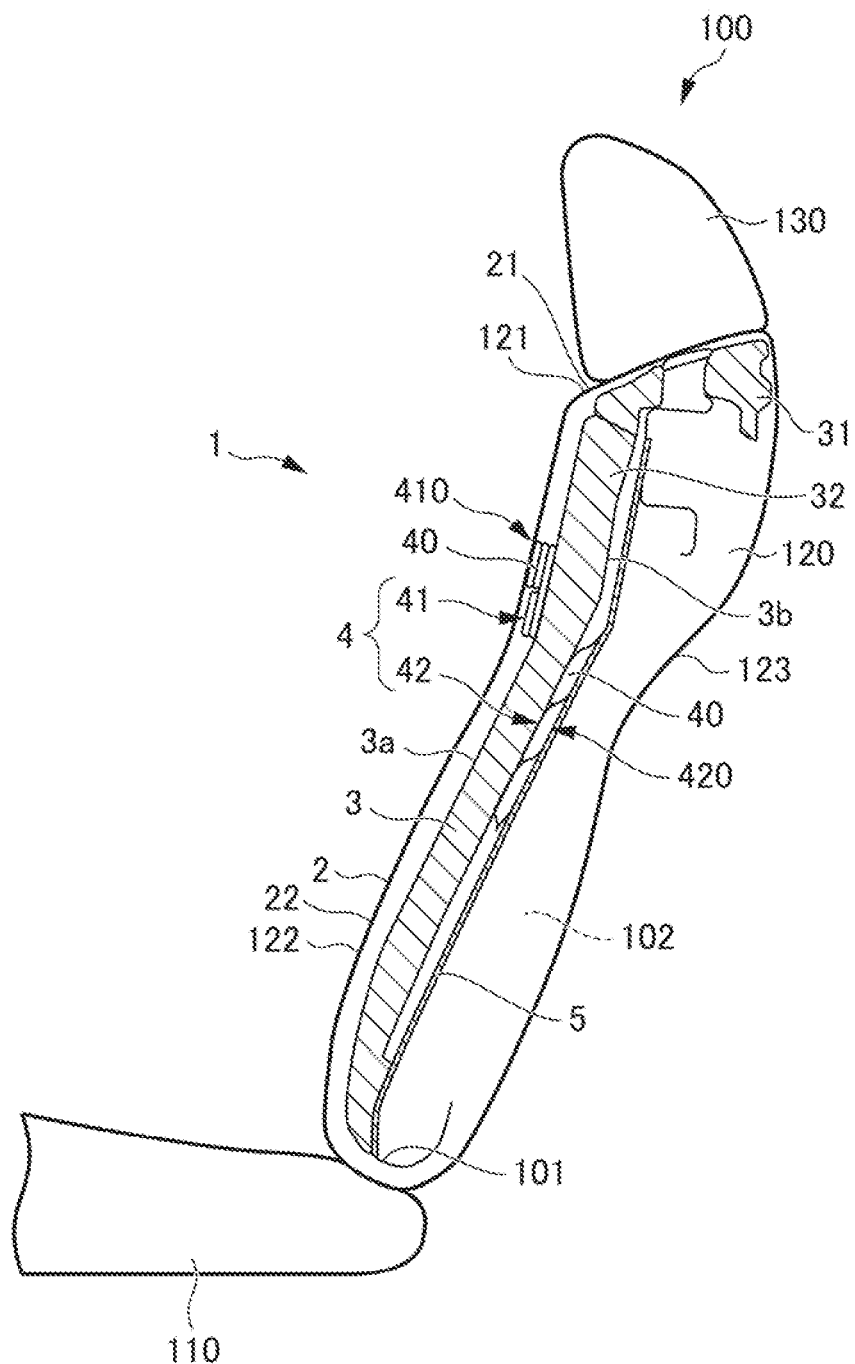
FIG. 3 is a schematic cross-sectional view of the seat adjustment device according to the embodiment.

The pad 3 includes a top pad 31 and a front pad 32. As illustrated in FIG. 3, the top pad 31 is disposed inside the top face 121 of the seat back part 120. The front pad 32 is disposed inside the front face 122 of the seat back part 120. The top pad 31 and the front pad 32 are separate and independent from each other. A front lower end of the top pad 31 is adjacent to an upper end of the front pad 32.

The airbags 4 are pneumatic devices that can be inflated and deflated using air pressure. The airbags 4 are connected to an air pump and a hose, and a controller (not shown) for controlling the air pump and the hose, so that the amount of air in the airbags 4 is adjustable. The airbags 4 are disposed on the rear surface of the seat cover 2, and both on a front surface 3a and a rear surface 3b of the pad 3. Each of the airbags 4 includes a plurality of small sub-bags 40. The sub-bags 40 are stacked on one another to form the airbag 4. As illustrated in FIG. 2, each of the sub-bags 40 has an elongate tubular shape. The sub-bags 40 are disposed with a longitudinal direction thereof extending in a width direction of the seat 100. The airbags 4 include a first airbag 41 that is disposed on one of the front and rear surfaces 3a and 3b of the pad 3, and a second airbag 42 that is disposed on the other.

The first airbag 41 is an airbag 4 that is disposed on the front surface 3a of the pad 3. The first airbag 41 extends longer than the second airbag 42 described below in a direction substantially perpendicular to the front and rear surfaces of the pad 3, which in other words is a thickness direction of the pad 3. The substantially perpendicular direction is not limited to a direction intersecting with the front and rear surfaces of the pad 3 exactly at 90 degrees, and conceptually encompasses any direction deemed to be the thickness direction of the pad 3.

Figure 4:
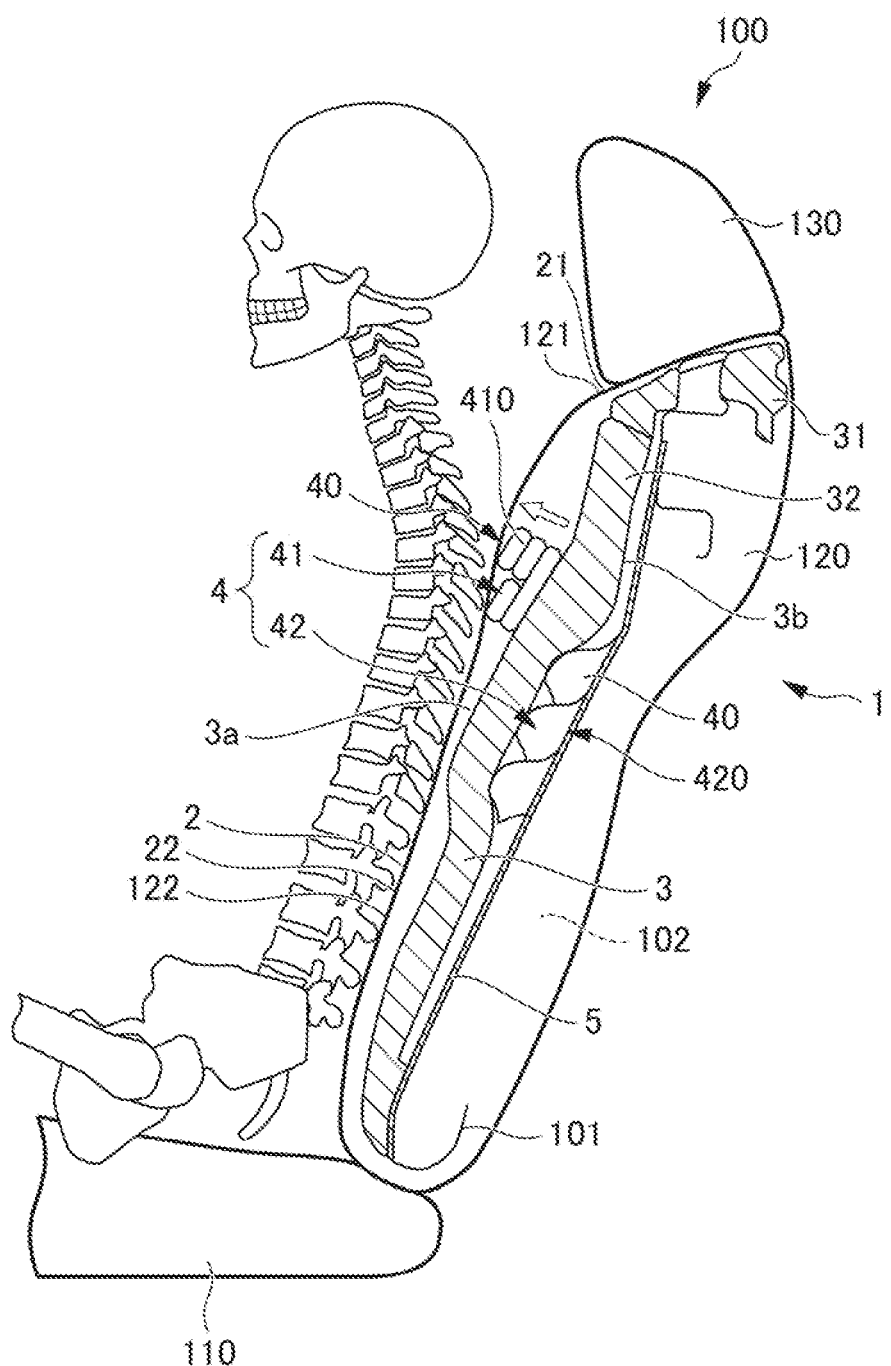
FIG. 4 is a diagram illustrating the seat adjustment device according to the embodiment in use.

As illustrated in FIG. 2, the first airbag 41 includes a first airbag group 410. The first airbag group 410 includes a plurality of sub-bags 40 arranged in the direction substantially perpendicular to the front and rear surfaces of the pad 3. The sub-bags 40 forming the first airbag group 410 are stacked on one another in the thickness direction of the pad 3. The length of the first airbag 41 in the direction substantially perpendicular to the front and rear surfaces of the pad 3 increases with an increase in the number of thicknesses of the sub-bags 40 stacked on one another in a cross-sectional view. Note that no particular limitations are placed on the arrangement and the number of the sub-bags 40 in the first airbag 41, and some of the sub-bags 40 may be arranged adjacent to one another along the front surface 3a of the pad 3 as shown in FIGS. 3 and 4. In FIGS. 3 and 4, one relatively large sub-bag 40 is disposed in an innermost position in direct contact with the front surface 3a, and outer sub-bags 40 are arranged in an up-down direction while being disposed in two different positions on the innermost sub-bag 40. The first airbag 41 has three outer sub-bags 40, two of which are disposed in an upper position and one in a lower position in the seat back part 120. The seat adjustment device 1 may have a plurality of first airbags 41 as long as each first airbag 41 extends in the direction substantially perpendicular to the front and rear surfaces of the pad 3 as described above.

The second airbag 42 is an airbag 4 that is disposed on the rear surface 3b of the pad 3. The second airbag 42 extends longer than the first airbag 41 in a direction substantially parallel to the front and rear surfaces of the pad 3. The substantially parallel direction is not limited to a direction parallel to the front and rear surfaces of the pad 3, and conceptually encompasses any direction deemed to be extending along the front and rear surfaces of the pad 3.

The second airbag 42 includes a second airbag group 420. The second airbag group 420 includes a plurality of sub-bags 40 arranged in the direction substantially parallel to the front and rear surfaces of the pad 3. The sub-bags 40 forming the second airbag group 420 are stacked on one another in an extending direction of the front and rear surfaces of the pad 3. The length of the second airbag 42 in the direction substantially parallel to the front and rear surfaces of the pad 3 increases with an increase in the number of widths in the short direction of the sub-bags 40 stacked on one another in a cross-sectional view. The second airbag group 420 is in contact with the rear surface 3b of the pad 3 over an area of the stack of the sub-bags 40.

The first airbag 41 is located above the second airbag 42 in the seat back part 120 so that the first airbag 41 easily supports, for example, a portion of the user's thoracic spine. The second airbag 42 is located below the first airbag 41, and thus is spaced apart from the first airbag 41.

The mat member 5 is disposed to support the user's lower back and an area therearound. The mat member 5 is what may be referred to as a lumbar mat. The mat member 5 is disposed under the rear surface 3b of the pad 3 and is fixed using, for example, a wire. The mat member 5 is disposed with a front surface thereof in contact with a rear surface of the second airbag 42, and supports the second airbag 42 and a portion of the pad 3. The mat member 5 may be made from, for example, a foamable resin.

Referring to FIGS. 3 and 4, the following describes the seat adjustment device 1 according to the present embodiment in use. FIG. 3 shows the first airbag group 410 in a deflated state. Body shape and posture vary from person to person who sit on the seat 100. Merely moving the seating part 110 of the seat 100 in the front-rear direction and reclining the seat back part 120 can therefore be insufficient for the seat back part 120 to fully support the user. The user therefore adjusts degrees of inflation of the first and second airbag groups 410 and 420 depending on the user's posture using, for example, an operation unit (not shown) such as a remote controller or buttons provided around the seat 100. In a case where the user's upper body tends to be spaced apart from the seat back part 120 because, for example, the user has a hunched back or the user has a habit of leaning forward while driving, the amount of air in the first airbag group 410 is increased to inflate the first airbag group 410 as shown in FIG. 4. As a result, the seat cover 2 moves in a raised manner, making it easier to support the user. Furthermore, the amount of air in the second airbag group 420 located below the first airbag group 410 is increased to inflate the second airbag group 420. As a result, the front pad 32 of the pad 3 is raised frontward at a gentle angle. The raised front pad 32 pushes the user's back frontward. The location at which the seat cover 2 is folded toward the user is changed by adjusting the degrees of inflation and deflation of the first and second airbags 41 and 42. Thus, the front surface of the seat 100 comes in closer contact with the line of the user's back.

The present embodiment produces the following effects.

(1) The seat adjustment device 1 for adjusting the shape of the seat 100 includes the pad 3 including an elastomer, and the airbags 4 that are disposed on the front surface 3a and the rear surface 3b of the pad 3 and that are adjustable in amount of air therein. The airbags 4 include the first airbag 41 that is disposed on one of the front and rear surfaces 3a and 3b of the pad, and the second airbag 42 that is disposed on the other. The first airbag 41 is longer than the second airbag 42 in the direction substantially perpendicular to the front and rear surfaces of the pad 3, and the second airbag 42 is longer than the first airbag 41 in the direction substantially parallel to the front and rear surfaces of the pad 3. As one of the airbags 4 on the front surface 3a and the rear surface 3b of the pad 3 extends long and inflates in the direction substantially perpendicular to the front and rear surfaces of the pad 3, it is possible to raise the front surface of the seat 100 in the thickness direction to a significant extent. Furthermore, as the other airbag 4 extends long and inflates in the direction substantially parallel to the front and rear surfaces of the pad 3, it is possible to raise a specific area of the front surface of the seat 100 into a gentle curve. Employing these airbags 4 and allowing the airbags 4 to be inflated in both of the two different directions makes it possible to change and adjust the shape of the seat 100 more flexibly and freely, allowing for expanded range and magnitude of the change in the shape of the seat 100. Thus, the configuration described above enables the seat 100 to support the user's back more effectively.

(2) According to the present embodiment, the first airbag 41 is located above the second airbag 42. In this configuration, an upper portion of a seat back surface of the seat 100 is raised, and thus the seat 100 is easily made suitable in shape for the user in a case where the user has a hunched back, for example.

(3) According to the present embodiment, the first airbag 41 includes the first airbag group 410 including the plurality of sub-bags 40 arranged in the direction substantially perpendicular to the front and rear surfaces of the pad 3. The second airbag 42 includes the plurality of sub-bags 40 arranged in the direction substantially parallel to the front and rear surfaces of the pad 3. This configuration allows lengths by which the first airbag 41 and the second airbag 42 are extended in the substantially perpendicular direction and in the substantially parallel direction, which in other words are, for example, the size, the range, and the degree of inflation of each airbag, to be changed finely and flexibly. As a result, it is possible to change the shape of the seat 100 more flexibly and freely.

(4) According to the present embodiment, the seat adjustment device 1 further includes the mat member 5. In the seat adjustment device 1, the second airbag 42 is disposed on the rear surface 3b of the pad 3, and the mat member 5 is disposed against the rear surface of the second airbag 42. The thickness and the elasticity of the pad 3 can permit the pad 3 to absorb a change in the shape of the second airbag 42, making it difficult to change the shape of the pad 3. However, the mat member 5 works to support the second airbag group 420 and hold the rear surface of the second airbag group 420 so that the second airbag 42 is extended frontward when the second airbag 42 is inflated. Thus, it is possible to change the shape of the pad 3 in a stable manner.

Note that the present invention is not limited to the foregoing embodiment, and changes such as modifications and improvements to the extent that the objective of the present invention is achieved are encompassed by the present invention. For example, the foregoing embodiment is described using, as an example, the configuration in which the first airbag 41 is disposed on the front surface 3a of the pad 3 and the second airbag 42 is disposed on the rear surface 3b of the pad 3. However, the first airbag may be disposed on the rear surface of the pad and the second airbag may be disposed on the front surface of the pad.

The foregoing embodiment is described using an example in which the seat adjustment device 1 is provided in the seat back part 120. However, the seat adjustment device 1 may alternatively be provided in the seating part 110, or may be provided both in the seat back part 120 and in the seating part 110. The seat may be a one-person seat or a bench-type seat that two or more people can sit on.

The number and the shape of sub-bags for forming the first airbag group and the second airbag group are not limited to those in the foregoing embodiment. Furthermore, a configuration may be adopted in which when the first airbag and the second airbag are inflated or deflated, some of the sub-bags in either or both of the first airbag group and the second airbag group can be selectively inflated, or the degree of inflation can be changed on a sub-bag by sub-bag basis.

EXPLANATION OF REFERENCE NUMERALS

1: Seat adjustment device
2: Seat cover
3: Pad
3a: Front surface
3b: Rear surface
4: Airbag
5: Mat member 40: Sub-bag
21: Top seat cover portion
22: Front seat cover portion
41: First airbag
42: Second airbag
100: Seat
120: Seat back part
121: Top face
122: Front face
410: First airbag group
420: Second airbag group

What is claimed is:

1. A seat adjustment device for adjusting a shape of a seat, comprising:
   a pad including an elastomer; and
   airbags disposed on a front surface and a rear surface of the pad, the airbags being adjustable in amount of air therein,
   the airbags including a first airbag and a second airbag,
   the first airbag being disposed on one of the front and rear surfaces of the pad, the second airbag being disposed on the other,
   the first airbag being longer than the second airbag in a direction along a thickness direction of the pad,
   the second airbag being longer than the first airbag in a direction along the front and rear surfaces of the pad.

2. The seat adjustment device according td claim 1, wherein the first airbag is located above the second airbag.

3. The seat adjustment device according to claim 1, wherein
   the first airbag includes a first airbag group including a plurality of sub-bags arranged in the direction along the thickness direction of the pad, and
   the second airbag includes a second airbag group including a plurality of sub-bags arranged in the direction along the front and rear surfaces of the pad.

4. The seat adjustment device according to claim 2, wherein
   the first airbag includes a first airbag group including a plurality of sub-bags arranged in the direction along the thickness direction of the pad, and
   the second airbag includes a second airbag group including a plurality of sub-bags arranged in the direction along the front and rear surfaces of the pad.

5. The seat adjustment device according to claim 1, further comprising a r at member, wherein
   the second airbag is disposed on the rear surface of the pad, and
   the mat member is disposed against a rear surface of the second airbag.

* * * * *